United States Patent [19]
Carr

[11] 3,912,299
[45] Oct. 14, 1975

[54] TRAILER SWING AWAY STEP

[76] Inventor: George W. Carr, Box 14518, Albuquerque, N. Mex. 87111

[22] Filed: June 6, 1974

[21] Appl. No.: 476,962

[52] U.S. Cl. .................. 280/166; 105/443; 182/91
[51] Int. Cl.² .......................................... B60R 3/02
[58] Field of Search.... 280/166, 163, 164 R, 164 A; 105/443, 446; 182/89, 91 X, 95, 97

[56] References Cited
UNITED STATES PATENTS

| | | | |
|---|---|---|---|
| 389,332 | 9/1888 | Smith | 280/166 |
| 868,352 | 10/1907 | Marr | 182/89 |
| 875,540 | 12/1907 | Lohner | 182/89 |
| 2,990,212 | 6/1961 | Nicastro | 293/34 |
| 3,517,942 | 6/1970 | Cuffe et al. | 280/166 |

Primary Examiner—Kenneth H. Betts
Assistant Examiner—Michael J. Forman
Attorney, Agent, or Firm—Richard J. Myers

[57] ABSTRACT

A trailer swing away step structure is disclosed mounted to the underside of the rear shelf at the rear of the trailer and including a pivotally depending upright step having a horizontal longitudinal step member mounted on the outer end of a transverse bumper angle plate, the inner end of the bumper plate having attached thereto the lower end of the pivotal upright step arm which has its upper end pivotally attached to the trailer pivot bracket to place the horizontal step member adjacent the vertical plane of the side of the trailer, the structure further including a longitudinal upright lateral first stop being a U-shaped reinforcement channel to limit outward lateral movement of the arm and a second stop limiting inward lateral movement of the arm in the form of a U-shaped reaction bar having a longitudinal bar portion cooperating with channel in guiding pivotal action of the step in a vertical longitudinal plane and said bar having a pair of transverse arms attached to the channel, the outer one of which prevents outward rearward movement of the step.

20 Claims, 4 Drawing Figures

U.S. Patent  Oct. 14, 1975  3,912,299
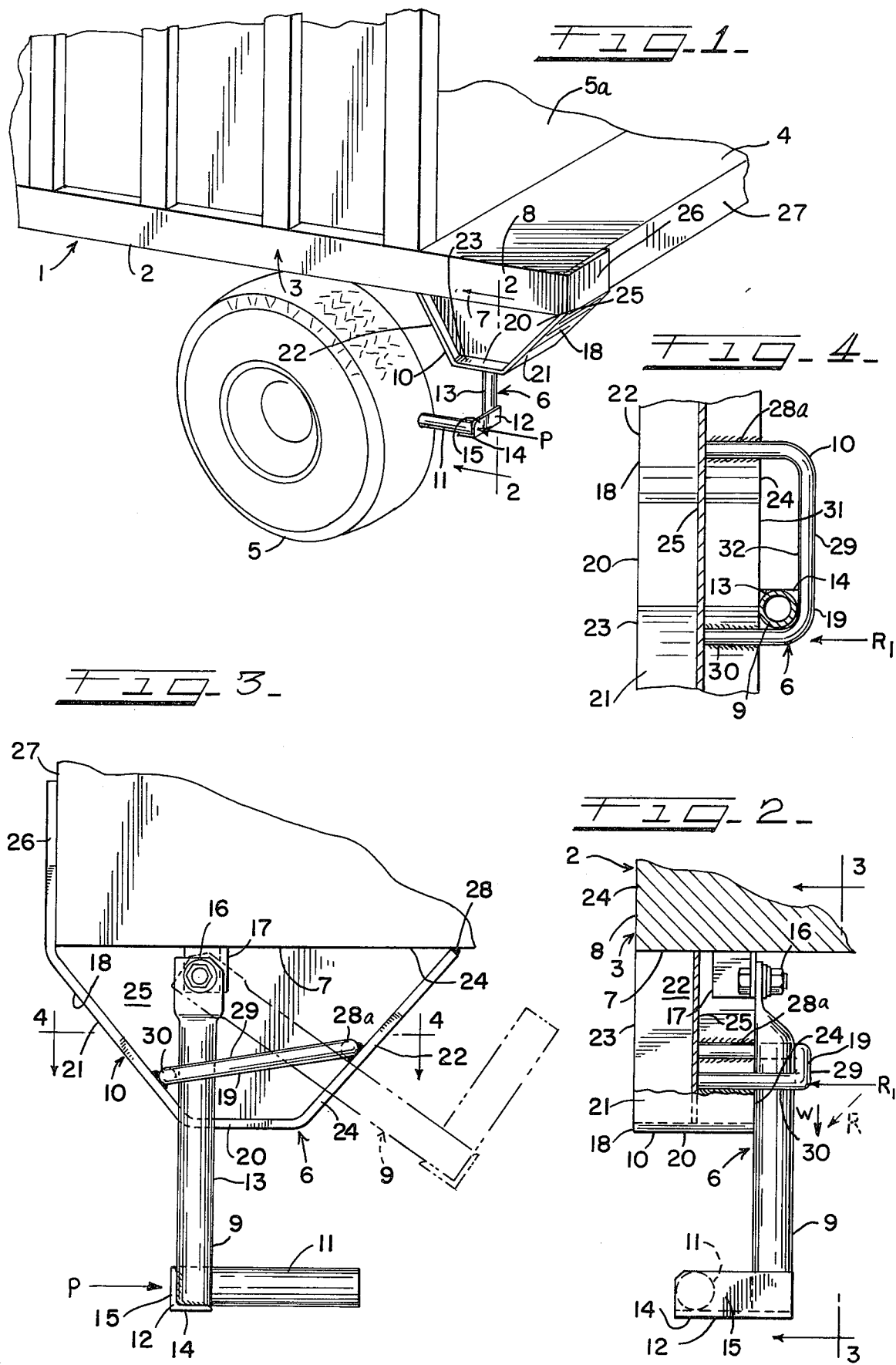

TRAILER SWING AWAY STEP

BACKGROUND OF THE INVENTION

1. Field of the Invention

This invention relates to steps for vehicles and, in particular, to rear end side steps for trailers in order to get aboard the side and end of the trailer at its rear end. This step makes it possible to climb in and out of the trailer.

2. Description of the Prior Art

The trailer steps of previous known construction are of the stirrup type at the rear end of the trailer and can not pivot. At the time the trailer is backed up to a dock, the step can be permanently damaged or bent by the dock. The instant inventive design prevents such damage to the step.

SUMMARY OF THE INVENTION

It is a general object of this invention to provide for a swing away step for a trailer or like vehicle which step at the rear corners of the trailer can be swung inwardly in a longitudinally extending vertical plane when the step engages in abutment such as a dock at the rear of the trailer when backing the trailer occurs.

It is a further object of this invention to provide for a trailer step that is limited in lateral movement as well as rearward movement and wherein the step is provided with lateral and rearward reinforcement means whereby pivot structure of the step is protected.

These and other objects and advantages of the invention will become apparent from reference to the following description, appended claims, and attached drawings.

BRIEF DESCRIPTION OF THE DRAWINGS

FIG. 1 is a perspective view of a portion of a rear end corner portion of a trailer illustrating the inventive step structure;

FIG. 2 is a sectional view taken along line 2—2 of FIG. 1;

FIG. 3 is a sectional view of the trailer taken along line 3—3 of FIG. 2; and

FIG. 4 is a sectional view taken along line 4—4 of FIG. 3.

DESCRIPTION OF THE PREFERRED EMBODIMENT

With reference now to the drawing there is shown in FIG. 1 a portion of a highway trailer 1 having a cargo body 2 with a side structure 3 and a rear platform or rear shelf 4 and a tired wheel 5 and the rear of floor 5a. My novel step structure 6 depends from the underside portion 7 of the side 8 of the shelf 4.

The step structure 6 (see FIGS. 2–4) includes the pivotal step 9 and the step restraining and reinforcement structure 10. The step 9 includes a horizontal longitudinally extending step member or rod 11 on which rests the operator's foot. The step member 11 (FIGS. 2 and 3) extends rearwardly and at its rear end is attached to the outer lateral end of the transverse kick or bumper angle plate 12. The inner lateral end of the angle plate 12 is attached to the lower end of the rod or upright pivotal step arm 13. The plate 12 includes the horizontal shelf portion 14 and the vertical back portion 15 to which are welded members 11 and 13. Since the members 11 and 13 are transversely or laterally spaced with the step member 11 in generally vertical alignment with the side of the trailer, the operator avoids uncomfortable stepping on the foot rod or step member 11. The pivot arm 13 at its upper end is pivotally attached by means of pivot means or structure 16 to the trailer mounted pivot bracket 17 on the underside of the trailer adjacent the rear end thereof and laterally inward of the foot step member 11.

The step restraining and reinforcement structure 10 guides the pivotal movement of arm 13 and limits its rearward and sideways or lateral movement as well as protects the pivot means 16 against breaking or twisting. The structure 10 includes the depending outer lateral or first stop and reinforcement member 18 in the form of a generally channel shaped or U-shaped member and an inner or second reinforcement and stop U-shaped member 19 which is attached generally at right angles to the first stop member 18 with the member 18 being in generally a vertical longitudinal plane and the member 19 being in generally a horizontal transversely extending plane but with the rear or outer end of member 19 being slightly elevated with respect to the forward and inner portion of member 19. The channel or first stop member 18 is provided with a bottom horizontal flange 20 and a pair of upwardly outwardly diverging sloping flanges 21 and 22, the flanges or plate 20, 21 and 22 being divided into an outside or front portion 23 and an inside portion 24 by a vertical longitudinal plate or web 25. The rear flange 21 has an upper vertical flange part 26 (see FIGS. 1 and 3) attached to the back side 27 of the shelf 4 and the upper end 28 of the inner flange 22 is attached to the underside 7 of the trailer at the shelf 4. The U-shaped member or second stop reinforcement member 19 is provided with an inner or front transverse arm or rod portion 28a, an inner longitudinal arm or rod portion 29 and an outer or rear transverse arm or rod portion 30. The ends of the arm portions 28a and 30 are welded to the web 25 and the underside end of arm 28a is welded to the top side of inner flange 22 and the underside end of arm 30 is welded to the top side of the rear flange 21. The inner longitudinal edge 31 (see FIG. 4) of the inner portion 24 cooperates with the outside facing longitudinal edge 32 of the longitudinal arm or bar portion 29 to provide guiding surfaces or edges for the pivotal arm 13 to move in a fixed vertical plane between the transverse bar portions 28a and 30 of the second stop member 19 with the rear stop bar portion 30 preventing further rearward pivoting of the pivot step 9. This arrangement prevents pivot means 16 from being bent or twisted.

From FIG. 3 it can be seen that the pivotal step 9 swings from the solid position inwardly or forwardly to the dotted line position when an obstruction, such as a loading dock, is encountered by the step when the trailer is backed to the dock, thus protecting the step. The step will return to its useful or down position (solid line position, FIG. 3) by stepping on it. Any force "P" deriving from backing up the trailer against the dock will swing the step inward. As seen by the force diagram of FIG. 2, resultant force "R" derived from force "W" (due to weight of operator) is taken by the stop member or bar 19 at the point $R_1$. Thus the forces on the pivot means 16 are reduced by the reaction bar 19. The reaction bar 19 is shaped whereby it has two points of attachment to the channel member 18, namely each arm 28a or 30 is attached to the respective flange 22 or 21 as well as the plate or web 25 for additional attachment strength. The reaction bar 19 acts as a stop and also collars the pivotal step as seen in FIG. 4 with arms 29 and 30 preventing twisting on the pivot means 16.

The edges of the stops 18 and 19 provide a definite desirable travel path for the pivotal step and the location of step member 11 under the trailer side makes operator trailer climbing easy.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a trailer having a step supporting rear end portion at a side of the trailer, the rear end portion having an underside, a personnel step structure on the trailer comprising:

a pivotal step including an upright arm having an upper end pivotally attached to the underside of said rear end portion, a step restraining and reinforcement structure fixedly attached to the underside of said rear end portion and guiding said arm for limited pivotal movement, the lower end of the upright arm of said step extending beyond the step restraining and reinforcement structure, a generally U-shaped reaction bar attached to said step restraining and reinforcement structure and entrapping said arm between the reaction bar and the step restraining and reinforcement structure, and said reaction bar having fore and aft transverse stop portions limiting pivotal movement of the arm.

2. The invention according to claim 1, and the lower end of the upright arm having a generally horizontal and transversely extending bumper member, and the bumper member having an outer end, a generally horizontally longitudinally extending foot rest having a rearward extending end attached to the outer end of the bumper member and adapted for mounting in a vertical plane generally coincident with the side of the trailer.

3. The invention according to claim 1, and the lower end of the upright arm having a generally transversely extending bumper member, and a generally longitudinally extending foot rest attached to the bumper member.

4. The invention according to claim 1, and the step restraining and reinforcement structure including an upright longitudinally extending step reinforcement and stop member, the U-shaped reaction bar being generally perpendicularly attached to said step reinforcement and stop member and having an elongated length extending generally in a horizontal plane, said reaction bar having a longitudinal bar portion in said general horizontal plane and said step reinforcement and stop member having an inner longitudinal edge cooperative with said longitudinal bar portion to constrain pivotal movement of the arm in a generally vertical longitudinally extending plane, and said longitudinal bar portion and the aft transverse stop portion forming a corner to entrap the arm in a generally upright position and inhibit rearward movement of the arm.

5. The invention according to claim 1, and the step restraining and reinforcement structure including an upright longitudinally extending step reinforcement and stop member, and the U-shaped reaction bar being generally perpendicularly attached to said step reinforcement and stop member.

6. The invention according to claim 1, and the step restraining and reinforcement structure including an upright longitudinally extending step reinforcement and stop member and the reaction bar being generally perpendicularly attached to said step reinforcement and stop member, and said reaction bar and said step reinforcement and stop member having longitudinal edges defining a path constraining pivotal movement of the arm in a generally vertical longitudinally extending plane.

7. The invention according to claim 6, and the longitudinal edge of said reaction bar and the aft transverse stop portion thereof forming a corner to entrap the arm in a generally upright position and inhibit rearward movement of the arm.

8. The invention according to claim 1, and the step restraining and reinforcement structure including an upright longitudinally extending step reinforcement and stop member and the reaction bar being generally perpendicularly attached to said step reinforcement and stop member, the reaction bar having an elongated length extending generally in a horizontal plane, said step reinforcement and stop member comprising a generally U-shaped member having an upright web attached to the underside of said rear end portion, a lower horizontally extending plate and a pair of upright plates, the lower and upright plates being attached to the web to define the generally U-shaped member, and the transverse stop portions of the reaction bar being attached respectively to the upright plates and the ends of the stop portions being fixedly attached to the upright web.

9. The invention according to claim 1, and the step restraining and reinforcement structure including an upright longitudinally extending step reinforcement and stop member and the U-shaped reaction bar being generally perpendicularly attached to said step reinforcement and stop member, and said step reinforcement and stop member comprising a generally U-shaped member having an upright web attached to the underside of said rear end portion, a lower horizontally extending flange and a pair of upright flanges, the lower and upright flanges being attached to the web to define the generally U-shaped member.

10. The invention according to claim 9, and each of the upright flanges diverging outward and upward from one another for attachment to the underside of the trailer.

11. The invention according to claim 9, and the reaction bar having an inner edge, the lower flange having inner and outer edges on either side of the web, the inner edge of the lower flange along with the inner edge of the reaction bar defining a guiding slot for limited movement of the arm in a generally vertical longitudinal plane.

12. A personnel step structure for mounting on the rear end portion of a trailer at a side of the trailer comprising:
   a pivotal step including an upright arm having an upper end for pivotal attachment to the underside of the trailer rear end portion,
   a step restraining and reinforcement structure for fixed attachment to the underside of the trailer rear end portion and guiding said pivotal step for limited pivotal movement in a longitudinally extending vertical plane,
   the lower end of the upright arm of said step extending beyond the step restraining and reinforcement structure,
   a generally U-shaped reaction bar attached to said step restraining and reinforcement structure and entrapping said arm between the reaction bar and the step restraining and reinforcement structure for limited pivotal movement of said arm, and
   said reaction bar having fore and aft transverse stop portions limiting pivotal movement of the arm.

13. The invention according to claim 12, and
   the step having a lower end and a generally horizontal and transversely extending bumper member having an inner end attached to the lower end of the arm the bumper member having an outer end, and
   a generally horizontally longitudinally extending foot rest having a rearward extending end attached to the outer end of the bumper member and the foot rest being adapted for mounting in a vertical plane generally coincident with the side of the trailer.

14. The invention according to claim 12, and
   the step having a lower end and a generally transversely extending bumper member attached to the lower end of the arm, and
   a generally longitudinally extending foot rest attached to the bumper member and the foot rest being adapted for mounting in a vertical plane generally coincident with the side of the trailer.

15. The invention according to claim 12, and
   the step restraining and reinforcement structure including an upright longitudinally extending step reinforcement and stop member, the reaction bar being generally perpendicularly attached to said step reinforcement and stop member and having an elongated length extending generally in a horizontal plane,
   said reaction bar having a longitudinal bar portion in said general horizontal plane and said step reinforcement and stop member having an inner longitudinal edge cooperative with said longitudinal bar portion to constrain pivotal movement of the arm in a generally vertical longitudinally extending plane, and
   said longitudinal bar portion and the aft transverse stop portion forming a corner to entrap the arm in a generally upright position and inhibit rearward movement of the arm.

16. The invention according to claim 12, and
   the step restraining and reinforcement structure including an upright longitudinally extending step reinforcement and stop member and the reaction bar being generally perpendicularly attached to said step reinforcement and stop member, and
   said reaction bar and said step reinforcement and stop member having longitudinal edges defining a path constraining pivotal movement of the arm in a generally vertical longitudinally extending plane.

17. The invention according to claim 12, and
   the step restraining and reinforcement structure including an upright longitudinally extending step reinforcement and stop member, and
   the U-shaped reaction bar being generally perpendicularly attached to said step reinforcement and stop member.

18. The invention according to claim 12, and
   the step restraining and reinforcement structure including an upright longitudinally extending step reinforcement and stop member and the U-shaped reaction bar being generally perpendicularly attached to said step reinforcement and stop member, and
   said step reinforcement and stop member comprising a generally U-shaped member having an upright web attached to the underside of said rear end portion, a lower horizontally extending plate and a pair of upright plates, the lower and upright plates being attached to the web to define the generally U-shaped member.

19. The invention according to claim 12, and
   the step restraining and reinforcement structure including an upright longitudinally extending step reinforcement and stop member, the reaction bar being generally perpendicularly attached to said step reinforcement and stop member and having an enlongated length extending generally in a horizontal plane,
   said step reinforcement and stop member comprising a generally U-shaped member having an upright web attached to the underside of said rear end portion, a lower horizontally extending plate and a pair of upright plates, the lower and upright plates being attached to the web to define the generally U-shaped member, and
   the transverse stop portions of the reaction bar being attached respectively to the upright plates and the ends of the transverse stop portions being fixedly attached to the upright web.

20. In a trailer having a step supporting rear end portion at a side of the trailer, the rear end portion having an underside, a personnel step structure on the trailer comprising:
   a pivotal step including an upright arm having an upper end pivotally attached to the underside of said rear end portion,
   a step restraining and reinforcement structure fixedly attached to the underside of said rear end portion and guiding said pivotal step for limited pivotal movement in a longitudinally extending vertical plane,
   the step having a lower end and a generally transversely extending bumper member attached to the lower end of the arm,
   a generally longitudinally extending foot rest attached to the bumper member and adapted for mounting in a vertical plane generally coincident with the side of the trailer,
   the step restraining and reinforcement structure including an upright longitudinally extending step reinforcement and stop member and a generally U-shaped reaction bar generally perpendicularly attached to said step reinforcement and stop member and entrapping said step between the reaction bar and the step reinforcement and stop member for limited pivotal movement of said step, and said reaction bar having fore and aft transverse stop portions limiting pivotal movement of the arm.

* * * * *

UNITED STATES PATENT OFFICE
CERTIFICATE OF CORRECTION

PATENT NO. 3,912,299

DATED : October 14, 1975

INVENTOR(S) George W. Carr

It is certified that error appears in the above–identified patent and that said Letters Patent are hereby corrected as shown below:

[73] Assignee: Pullman Incorporated
Chicago, Ill.

Signed and Sealed this sixth Day of January 1976

[SEAL]

Attest:

RUTH C. MASON
*Attesting Officer*

C. MARSHALL DANN
*Commissioner of Patents and Trademarks*